United States Patent
Ahn et al.

(10) Patent No.: US 9,100,159 B2
(45) Date of Patent: Aug. 4, 2015

(54) METHOD FOR EFFECTIVELY TRANSMITTING CONTROL SIGNAL IN WIRELESS COMMUNICATION SYSTEM

(71) Applicant: OPTIS CELLULAR TECHNOLOGY, LLC, Plano, TX (US)

(72) Inventors: Joon Kui Ahn, Anyang-si (KR); Dae Won Lee, Anyang-si (KR); Young Woo Yun, Anyang-si (KR); Ki Jun Kim, Anyang-si (KR)

(73) Assignee: Optis Cellular Technology, LLC, Plano, TX (US)

( * ) Notice: Subject to any disclaimer, the term of this patent is extended or adjusted under 35 U.S.C. 154(b) by 0 days.

(21) Appl. No.: 14/592,980

(22) Filed: Jan. 9, 2015

(65) Prior Publication Data

US 2015/0124666 A1 May 7, 2015

Related U.S. Application Data

(63) Continuation of application No. 14/029,516, filed on Sep. 17, 2013, now Pat. No. 8,935,587, which is a continuation of application No. 13/802,066, filed on Mar. 13, 2013, now Pat. No. 8,560,909, which is a
(Continued)

(30) Foreign Application Priority Data

Mar. 13, 2009 (KR) .......................... 10-2009-0021715

(51) Int. Cl.
G08C 25/02 (2006.01)
H04L 1/18 (2006.01)
(Continued)

(52) U.S. Cl.
CPC ............... *H04L 5/0055* (2013.01); *H04L 5/14* (2013.01); *H04L 12/52* (2013.01)

(58) Field of Classification Search
CPC .......... H04L 5/0055; H04L 5/14; H04L 12/52
USPC ............ 714/746, 18, 748–749; 370/248, 252, 370/328–329
See application file for complete search history.

(56) References Cited

U.S. PATENT DOCUMENTS

| 2007/0223404 A1 | 9/2007 | Khan et al. |
| 2008/0002698 A1 | 1/2008 | Pantalone et al. |

(Continued)

FOREIGN PATENT DOCUMENTS

| JP | 2005-136597 | 5/2005 |
| KR | 2007-0105287 | 10/2007 |

(Continued)

OTHER PUBLICATIONS

Zhaoji et al., Impact of ACK/NACK signalling errors on high speed uplink packet access (HSUPA), 2005, IEE, pp. 2223-2227.*
(Continued)

*Primary Examiner* — Shelly A Chase
(74) *Attorney, Agent, or Firm* — Nixon & Vanderhye P.C.

(57) ABSTRACT

A method of performing HARQ performed by a user equipment (UE) is provided. The method includes receiving a bundling indicator which indicates the number of bundled downlink subframes, determining whether at least one bundled downlink subframe is missed by comparing the bundling indicator with the number of detected bundled downlink subframes, generating a representative ACK/NACK signal when no bundled downlink subframe is missed, and transmitting the representative ACK/NACK signal on an uplink channel. Recovery capability is maximized and the packet loss is reduced in such a situation that less number of ACK/NACK signals are fed back than that of downlink packets.

14 Claims, 12 Drawing Sheets

Related U.S. Application Data continuation of application No. 13/563,472, filed on Jul. 31, 2012, now Pat. No. 8,423,858, which is a continuation of application No. 13/345,532, filed on Jan. 6, 2012, now Pat. No. 8,250,443, which is a continuation of application No. 12/836,403, filed on Jul. 14, 2010, now Pat. No. 8,108,757, which is a continuation of application No. 12/404,873, filed on Mar. 16, 2009, now Pat. No. 7,774,686.

(60) Provisional application No. 61/036,985, filed on Mar. 16, 2008, provisional application No. 61/047,107, filed on Apr. 23, 2008.

(51) Int. Cl.
*H04L 5/00* (2006.01)
*H04L 5/14* (2006.01)
*H04L 12/52* (2006.01)

(56) References Cited

U.S. PATENT DOCUMENTS

| | | |
|---|---|---|
| 2009/0046649 A1 | 2/2009 | Gao et al. |
| 2009/0196204 A1 | 8/2009 | Astely et al. |
| 2009/0213769 A1 | 8/2009 | Shen et al. |

FOREIGN PATENT DOCUMENTS

| | | |
|---|---|---|
| KR | 2007-0108460 | 11/2007 |
| KR | 2007-0119957 | 12/2007 |
| WO | WO 2007/129872 | 11/2007 |

OTHER PUBLICATIONS

Burstrom et al., Uplink control channel in E-URTA, radio link and radio network evaluation, Mar. 2008, IEEE, pp. 835-839.*
Ericsson: "Combination of ACK/NACK's for TDD" Feb. 2008, TSG-RAN WG1 #52, R1-080870, pp. 1-2.
Alcatel-Lucent: "Implications of Solutions for subframe bundling", Feb. 2008, 3GPP TSG-RAN WG1 #52, R1-080914, pp. 1-4.
European Official Action dated Jan. 14, 2014 in European Application No. 09 155 262.0 - 1860.
Extended European Search Report dated Aug. 11, 2009 in EP 09155262.0, 9 pages.
European Examination Report dated Jan. 14, 2014 in EP 09155262.0, 10 pages.
Alcatel-Lucent; Implications of Solutions for Subframe Bundling, $3^{rd}$ Generation Partnership Project; Mobile Competence Centre; Feb. 5, 2008, vol. RAN WG1; No. Sorrento, Italy, 4 pages.
Ericsson; HARQ Operation in Case of UL Power Limitation, GGPP Draft, R2-074509, TSG-RAN WG23 #59bis; Oct. 12, 2007; pp. 1-4.
Motorola; UL ACK/NACK for TDD, $3^{rd}$ Generation Partnership Project; Mobile Competence Centre; Feb. 5, 2008; vol. RAN WG1; No. Sorrento, Italy, 6 pages.
Yuk et al., Parity based reliable multicast method for Wireless LAN environments, 1999, IEEE, p. 1217-1221.

* cited by examiner

METHOD FOR EFFECTIVELY TRANSMITTING CONTROL SIGNAL IN WIRELESS COMMUNICATION SYSTEM

CROSS-REFERENCE TO RELATED APPLICATIONS

This application is a continuation of U.S. patent application Ser. No. 14/029,516, filed Sep. 17, 2013, which is a continuation of U.S. patent application Ser. No. 13/802,066, filed Mar. 13, 2013 (now U.S. Pat. No. 8,560,908, issued on Oct. 15, 2013), which is a continuation of U.S. patent application Ser. No. 13/563,472 (now U.S. Pat. No. 8,423,858, issued on Apr. 16, 2013), filed Jul. 31, 2012, which is a continuation of U.S. patent application Ser. No. 13/345,532 (now U.S. Pat. No. 8,250,443, issued on Aug. 21, 2012), filed Jan. 6, 2012, which is a continuation of U.S. patent application Ser. No. 12/836,403 (now U.S. Pat. No. 8,108,757, issued on Jan. 31, 2012), filed Jul. 14, 2010, which is a continuation of U.S. patent application Ser. No. 12/404,873 (now U.S. Pat. No. 7,774,686, issued on Aug. 10, 2010), filed Mar. 16, 2009, which claims the benefit of priority from U.S. Provisional Application No. 61/036,985, filed on Mar. 16, 2008, U.S. Provisional Application No. 61/047,107, filed on Apr. 23, 2008, and Korean Patent Application No. 10-2009-0021715, filed on Mar. 13, 2009. The entire contents of all of the above applications are hereby incorporated by reference.

BACKGROUND

1. Field of the Invention

The present invention relates to wireless communication, and more particularly, to a method for effectively transmitting a control signal in a wireless communication system.

2. Related Art

Next-generation mobile communication systems are being standardized for the purpose of efficient connection with wired and wireless communication networks and integrated service although communication systems of previous generations provide simple wireless communication services. As high-speed large-capacity communication systems capable of processing and transmitting information of various types such as video data and radio data as well as audio data are required, development of a technique capable of transmitting a large quantity of data, which corresponds to the capacity of a wired communication network, through a wireless communication network is needed. Accordingly, an appropriate error detection scheme which can minimize information loss and increase system transmission efficiency to improve system performance becomes an essential element.

Automatic Repeat request (ARQ) transmits positive acknowledgement (ACK) signal to a transmitter when a receiver properly receives data and transmits a negative acknowledgement (NACK) signal to the transmitter when the receiver does not properly receive the data. In Hybrid Automatic Repeat request (HARQ), an ACK/NACK signal transmitted by a data receiver is represented by a small number of bits, in general.

To improve data transmission efficiency in data processing, HARQ corresponding to a combination of ARQ and channel coding of a physical layer has been proposed. HARQ not only re-transmits data that is not received by a transmitter but also store data that is not received by a receiver. When the receiver receives re-transmitted data, the received data is added to the previously stored data to improve a performance gain.

Since the receiver uses additional feedback radio resources to feed back an ACK/NACK signal to the transmitter in HARQ, efficient use of limited feedback radio resources is very important.

Hereinafter, a downlink represents a communication link from a base station to a user equipment (UE) and an uplink represents a communication link from the UE to the base station. The downlink is also referred to as a forward link and the uplink is also referred to as a reverse link. A transmitter may be a part of the base station and a receiver may be a part of the UE in the downlink. The transmitter may be a part of the UE and the receiver may be a part of the base station in the uplink.

A method of discriminating radio resources used for downlink transmission from radio resources such as frequency, time and code domains used for uplink transmission is required. This method is referred to as duplex. The uplink and the downlink can be discriminated from each other in the frequency, time and code domains as does in a multiple access scheme for identifying different users. The duplex is classified into frequency division duplexing (FDD) which discriminates the uplink and the downlink from each other according to frequency and time division duplexing (TDD) which discriminates the uplink and the downlink from each other according to time.

The uplink is discriminated from the downlink in the frequency domain in FDD, and thus transmission of data between a base station and a UE can be continuously performed in the time domain in each link. While FDD is suitable for symmetric service such as voice communication because it symmetrically allocates frequencies having the same level to the uplink and the downlink, TDD is suitable for asymmetric service such as Internet service and thus researches on the TDD have been actively carried out recently.

TDD is suitable for the asymmetric service because it can allocate time having different lengths to the uplink and the downlink. Furthermore, uplink data and downlink data are transmitted and received in the same frequency band in TDD, and thus uplink and downlink channel states correspond to each other. Accordingly, TDD is suitable for array antenna technology because a channel state can be immediately estimated when a signal is received. TDD uses the entire frequency band as the uplink or the downlink, discriminates the uplink from the downlink in the time domain, uses the frequency band as the uplink for a predetermined time and uses the frequency band as the downlink for a predetermined time, and thus transmission and reception of data between a base station and a UE cannot be simultaneously performed.

When a base station transmits downlink data in a mobile communication system, a UE transmits ACK/NACK signals with respect to the downlink data to the uplink after a predetermined lapse of time. If the time used for downlink transmission is longer than the time used for uplink transmission, the number of ACK/NACK signals to be transmitted to the uplink may be restricted. That is, a single UE should transmit ACK/NACK signals by using a number of ACK/NACK resources smaller than N for received N downlink packets. Accordingly, there is a need for an ACK/NACK signal transmitting method capable of minimizing packet loss and maximizing recovery capability even when a number of ACK/NACK signals smaller than the number of downlink packets are fed back.

SUMMARY

The present invention provides a method of effectively transmitting an ACK/NACK signal in wireless communication system.

According to an aspect of the present invention, a method of performing HARQ performed by a user equipment (UE) is provided. The method includes receiving a bundling indicator which indicates the number of bundled downlink subframes, each subframe of the bundled downlink subframes being used to transmit one or plural codewords, determining whether at least one bundled downlink subframe is missed by comparing the bundling indicator with the number of detected bundled downlink subframes, generating a representative ACK/NACK signal when no bundled downlink subframe is missed, wherein the representative ACK/NACK signal is an ACK signal if all codewords in the detected bundled downlink subframes are successfully received, otherwise the representative ACK/NACK signal is a NACK signal, and transmitting the representative ACK/NACK signal on an uplink channel.

The representative ACK/NACK signal may not be transmitted if at least one bundled downlink subframe is missed.

The uplink channel may be Physical Uplink Control Channel (PUCCH). The uplink resource for the uplink channel carrying the representative ACK/NACK signal may be associated with the last detected bundled downlink subframe and/or the downlink resource used for the scheduling of the last detected bundled downlink subframe.

The bundling indicator may be transmitted on a downlink channel, the resource for the uplink channel is associated with the downlink channel for the nearest bundled downlink subframe to the uplink subframe.

The uplink channel may be Physical Uplink Shared Channel (PUSCH). The bundling indicator may be an accumulative number of the bundled downlink subframes. The bundling indicator may be included in downlink scheduling information.

The bundling indicator may be included in uplink scheduling information.

According to another aspect of the present invention, a method of transmitting a control signal performed by a UE is provided. The method includes receiving a bundling indicator which indicates the number of bundled downlink subframes within M (M>1) downlink subframes, incrementing a counter when a bundled downlink subframe is detected, generating a representative NACK signal if the bundling indicator is not equal to the counter, wherein the representative NACK signal represents unsuccessful reception for all codewords in the bundled downlink subframes, and transmitting the representative NACK signal on an uplink shared channel in an uplink subframe.

The bundling indicator may be received on a downlink control channel. The bundling indicator may be received on a downlink control channel. The bundling indicator may be included in the bundled downlink subframes.

The positions and the number of the bundled downlink subframes may be predetermined with respect to the uplink subframe.

The number of the bundled downlink subframes may be equal to or bigger than the number of the uplink subframe.

According to yet another aspect of the present invention, a method of transmitting a control signal performed by a UE is provided. The method includes receiving codewords in bundled downlink subframes, incrementing a counter when a bundled downlink subframe is detected, generating a representative ACK/NACK signal, wherein the representative ACK/NACK signal is a NACK signal when at least one bundled downlink subframe is missed or when at least one codeword is not successfully received, otherwise the representative ACK/NACK signal is an ACK signal when all of the bundled downlink subframes are detected and all of the codewords are successfully received, and transmitting the representative ACK/NACK signal and the counter on an uplink shared channel in an uplink subframe.

According to yet another aspect of the present invention, a method of performing HARQ performed by a UE is provided. The method includes receiving bundled downlink subframes, each subframe of the bundled downlink subframes being used to transmit one or plural codewords, generating a representative ACK/NACK signal wherein the representative ACK/NACK signal is an ACK signal if all codewords in detected bundled downlink subframes are successfully received, and the representative ACK/NACK signal is a NACK signal if at least one codeword in the detected bundled downlink subframes is not successfully received, and transmitting the representative ACK/NACK signal on an uplink channel, wherein an uplink resource for the uplink channel carrying the representative ACK/NACK signal is associated with the last detected bundled downlink subframe and/or the downlink resource used for the scheduling of the last detected bundled downlink subframe.

According to yet another aspect of the present invention, an apparatus for transmitting an ACK/NACK signal using HARQ is provided. The apparatus includes a receiving unit for receiving a bundling indicator which indicates the number of bundled downlink subframes, each subframe of the bundled downlink subframes being used to transmit one or plural codewords, a determining unit for determining whether at least one bundled downlink subframe is missed by comparing the bundling indicator with the number of detected bundled downlink subframes, a generating unit for generating a representative ACK/NACK signal when no bundled downlink subframe is missed, wherein the representative ACK/NACK signal is an ACK signal if all codewords in the detected bundled downlink subframes are successfully received, otherwise the representative ACK/NACK signal is a NACK signal, and a transmitting unit for transmitting the representative ACK/NACK signal on an uplink channel.

Recovery capability is maximized and the packet loss is reduced in such a situation that less number of ACK/NACK signals are fed back than that of downlink packets.

DESCRIPTION OF EXEMPLARY EMBODIMENTS

Figure 1:
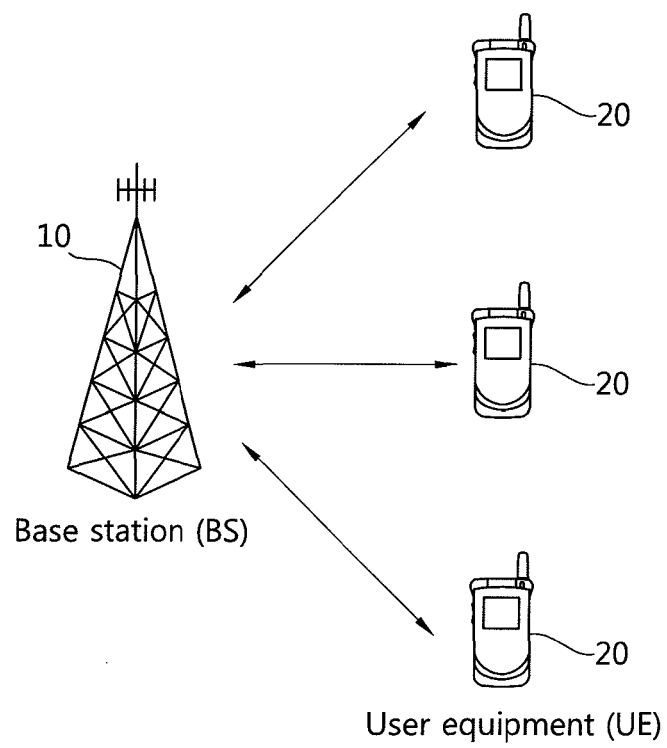
FIG. 1 shows a wireless communication system.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, the thickness of layers and regions are exaggerated for clarity. Like reference numerals in the drawings denote like elements.

FIG. 1 shows a wireless communication system. The wireless communication system can be widely deployed to provide a variety of communication services, such as voices, packet data, etc.

Referring to FIG. 1, the wireless communication system includes a base station (BS) 10 and at least one user equipment (UE) 20. The BS 10 is generally a fixed station that communicates with the UE 20 and may be referred to as another terminology, such as a node-B, a base transceiver system (BTS), an access point, etc. There are one or more cells within the coverage of the BS 10. The UE 20 may be fixed or mobile, and may be referred to as another terminology, such as a mobile station (MS), a user terminal (UT), a subscriber station (SS), a wireless device, etc.

A downlink represents a communication link from the BS 10 to the UE 20, and an uplink represents a communication link from the UE 20 to the BS 10. In downlink, a transmitter may be a part of the BS 10, and a receiver may be a part of the UE 20. In uplink, the transmitter may be a part of the UE 20, and the receiver may be a part of the BS 10.

Different multiple access schemes may be used for downlink and uplink transmissions. For example, orthogonal frequency division multiple access (OFDMA) is used for downlink, and single carrier-frequency division multiple access (SC-FDMA) is used for uplink.

There is no limit in the multiple access scheme used in the wireless communication system. The multiple access scheme may be based on code division multiple access (CDMA), time division multiple access (TDMA), frequency division multiple access (FDMA), SC-FDMA, OFDMA, or other well-known modulation schemes. In these modulation schemes, signals received from multi-users are demodulated to increase capacity of the communication system.

The layers of the radio interface protocol can be classified into a first layer (L1), a second layer (L2), and a third layer (L3) based on the open system interconnection (OSI) model that is well-known in a communication system. Compared with the OSI model, a physical (PHY) layer corresponds to the first layer L1, the medium access control (MAC) layer and the radio link control (RLC) layer correspond to the second layer L2, and the radio resource control (RRC) layer corresponds to the third layer L3. The physical layer provides an information transfer service using a physical channel, the MAC layer is connected with the physical layer through transport channel, and the radio RRC layer serves to control radio resources between the UE and the network.

Examples of a downlink transport channel include a broadcast channel (BCH) for transmitting system information and a downlink-shared channel (DL-SCH) for transmitting user traffic or control messages. The user traffic of downlink multicast or broadcast services or the control messages can be transmitted on the DL-SCH or an additional downlink multicast channel (DL-MCH). The downlink transport channel is mapped to a downlink physical channel.

Examples of the downlink physical channel include a physical downlink shared channel (PDSCH) mapped to the DL-SCH, and a physical downlink control channel (PDCCH) for transmitting a control signal.

Examples of an uplink transport channel include a random access channel (RACH) for transmitting initial control messages and an uplink-shared channel (UL-SCH) for transmitting user traffic or control messages. The uplink transport channel is mapped to a physical uplink channel. Examples of the physical uplink channel include a physical random access channel (PRACH) mapped to the RACH, a physical uplink shared channel (PUSCH) mapped to the UL-SCH, and a physical uplink control channel (PUCCH) for uplink control messages. The PUSCH is a physical uplink shared channel, and is used when the UE transmits data in uplink.

The PDCCH is a downlink physical control channel and transmits control information for the PUSCH or the PDSCH. An uplink grant that is scheduling information for uplink data transmission and a downlink grant that is scheduling information for downlink data transmission can be transmitted through the PDCCH. Herein, the scheduling information implies control information including radio resource allocation for transmitting downlink data from the BS to the UE or for receiving uplink data from the UE, a modulation and coding scheme (MCS), MIMO information, etc.

Figure 2:
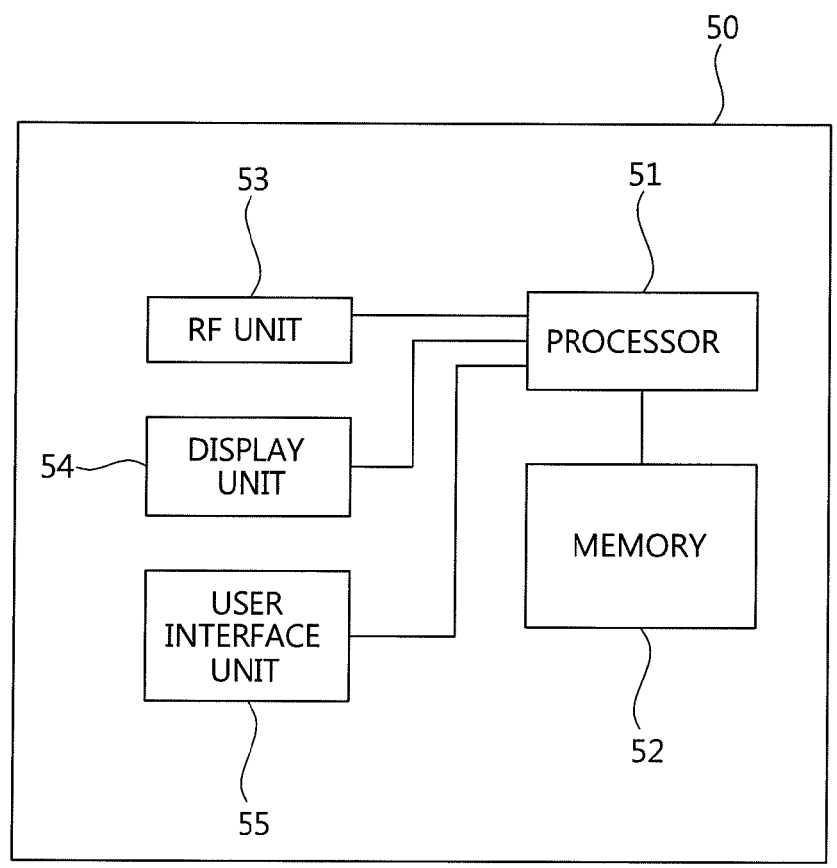
FIG. 2 is a block diagram of a UE

FIG. 2 is a block diagram of a UE 50. The UE 50 includes a processor 51, a memory 52, an RF unit 53, a display unit 54, and a user interface unit 54. The processor 51 implements layers of air interface protocol and provides a control plane and a user plane. Functions of the layers are implemented through the processor 51. The memory 52 is connected to the processor 51 and stores a UE driving system, application and general files. The display unit 54 displays information on the UE and may use well-known components such as organic light emitting diodes (OLEDs). The user interface unit 55 may be composed of a combination of well-known user interfaces such as a keypad or a touch screen. The RF unit 53 is connected to the processor and transmits and/or receives radio signals.

Figure 3:
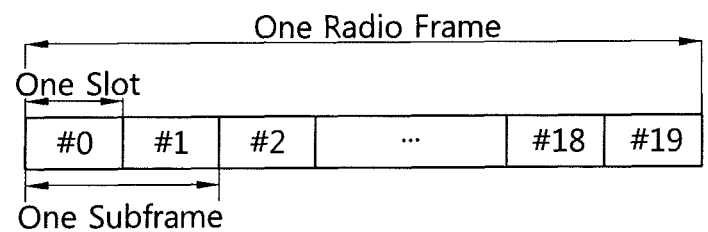
FIG. 3 illustrates an example of a structure of a radio frame.

FIG. 3 illustrates an example of a structure of a radio frame.

Referring to FIG. 3, the radio frame has ten subframes and each subframe may include two slots. A basic data transmission unit corresponds to a subframe and scheduling of downlink or uplink is performed based on the subframe. A single slot may include a plurality of OFDM symbols in the time domain and at least one subcarrier in the frequency domain. The single slot may include six or seven OFDM symbols.

Figure 4:
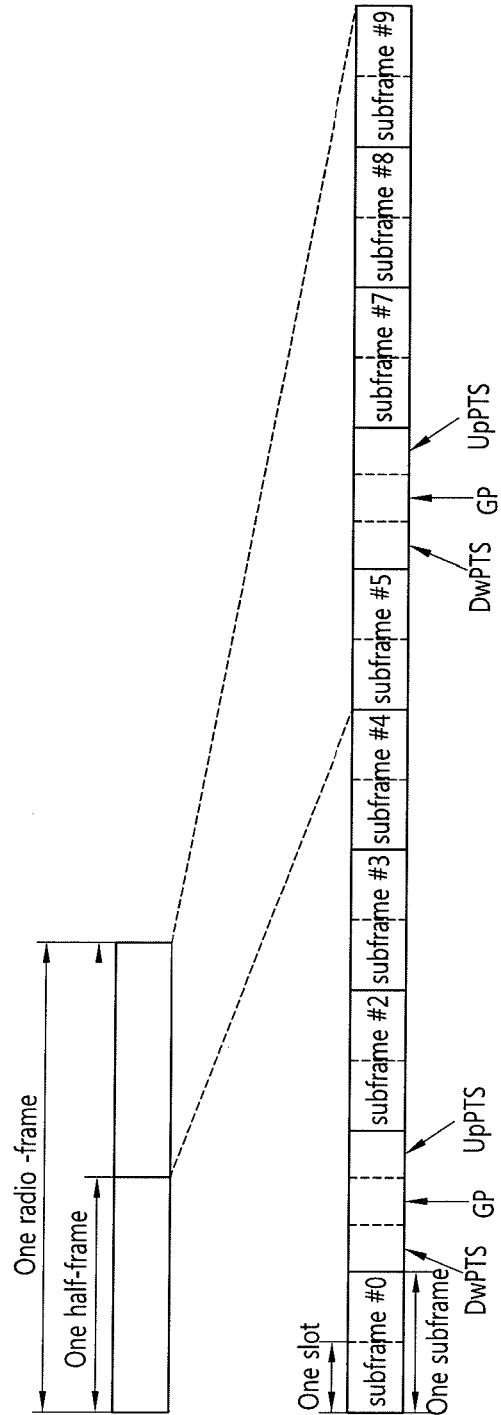
FIG. 4 illustrates another example of a structure of a radio frame, that is, TDD radio frame.

FIG. 4 illustrates another example of a structure of a radio frame, that is, TDD radio frame.

Referring to FIG. 4, the radio frame includes two half-frames. The half-frames have the same structure. Specifically, each half-frame includes 5 subframes and 3 fields, i.e., a downlink pilot time slot (DwPTS), a guard period (GP), and an uplink pilot time slot (UpPTS). The DwPTS is used for initial cell search, synchronization, or channel estimation in a UE. The UpPTS is used for channel estimation in a BS and uplink transmission synchronization of the UE. The GP is used to remove interference that occurs in uplink due to a multi-path delay of a downlink signal between uplink and downlink.

Table 1 shows an example of a configuration of the radio resource. The configuration of the radio frame indicates a specific rule according to which all subframes are allocated (or reserved) for uplink or downlink.

TABLE 1

| Config-uration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' denotes a subframe used for downlink transmission, and 'U' denotes a subframe used for uplink transmission. Further, 'S' denotes a special subframe that is used for a special purpose, such as, frame synchronization or downlink transmission. Hereinafter, a subframe used for downlink transmission is simply referred to as a downlink subframe, and a subframe used for uplink transmission is simply referred to as an uplink subframe. For each configuration, a position and the number of downlink and uplink subframes are different from each other within one radio frame.

A time point at which downlink is switched to uplink, or vice versa, is defined as a switching point. A switch-point periodicity represents a period in which the same switching pattern is repeated between uplink and downlink. The switch-pint periodicity is 5 ms or 10 ms. For example, in case of the configuration 1, switching occurs in the pattern of D→S→U→U→U from 0th to 4th subframes. In addition, from 5th to 9th subframes, switching occurs in the pattern of D→S→U→U→U in the same pattern as the previous switching. Since one subframe is 1 ms, the switch-point periodicity is 5 ms. That is, the switch-point periodicity is less than one radio frame length (i.e., 10 ms), and switching is repeated one time within the radio frame. For all configurations, 0th and 5th subframes and the DwPTS are used for downlink transmission. A 1st subframe in all configurations and a 6th subframe in configurations 0, 1, 2, and 6 are composed of the DwPTS, the GP, and the UpPTS. A time length of each field varies depending on configurations. The remaining 8 subframes other than the 1st and 6th subframes are composed of 2 slots.

If the switch-point periodicity is 5 ms, the UpPTS and 2nd and 7th subframes are reserved for uplink transmission. If the switch-point periodicity is 10 ms, the UpPTS and the 2nd subframe are reserved for uplink transmission, and the DwPTS, and 7th and 9th subframes are reserved for downlink transmission.

The configuration of Table 1 may be system information known by both the BS and the UE. The BS can inform the UE that an uplink-downlink allocation state of the radio frame is modified by transmitting only a configuration index whenever the configuration of the radio frame changes. The configuration is a sort of downlink control information. Similarly to other scheduling information, the configuration may be transmitted on a physical downlink control channel (PDCCH). Alternatively, the configuration may be control information commonly transmitted on a broadcast channel to all UEs existing in a cell. In addition, the configuration may be included in the system information. The number of half-frames included in the radio frame, the number of subframe included in the half-frame, and the combination of the downlink subframe and the uplink subframe in the TDD system are shown for exemplary purposes only.

In Table 1, if 'S' corresponds to downlink subframes, a single radio frame includes 8 downlink subframes and 2 uplink subframes in the case of configuration 2. That is, the ratio of the number of downlink subframes to the number of uplink subframes is 4:1. In this case, the UE must receive data through 4 downlink subframes and transmit ACK/NACK signals through a single uplink subframe. When the number of downlink subframes is greater than the number of uplink subframes as described above, uplink radio resources are insufficient for one-to-one mapping between subframe(s) for downlink data and subframe(s) for ACK/NACK signals. Accordingly, N:1 mapping is carried out between subframe(s) for data and subframe(s) for ACK/NACK signals. In this case, A single ACK/NACK signal is used as an HARQ feedback for transmission of plural PDSCHs for a single UE. This is referred to as ACK/NACK bundling.

Figure 5:
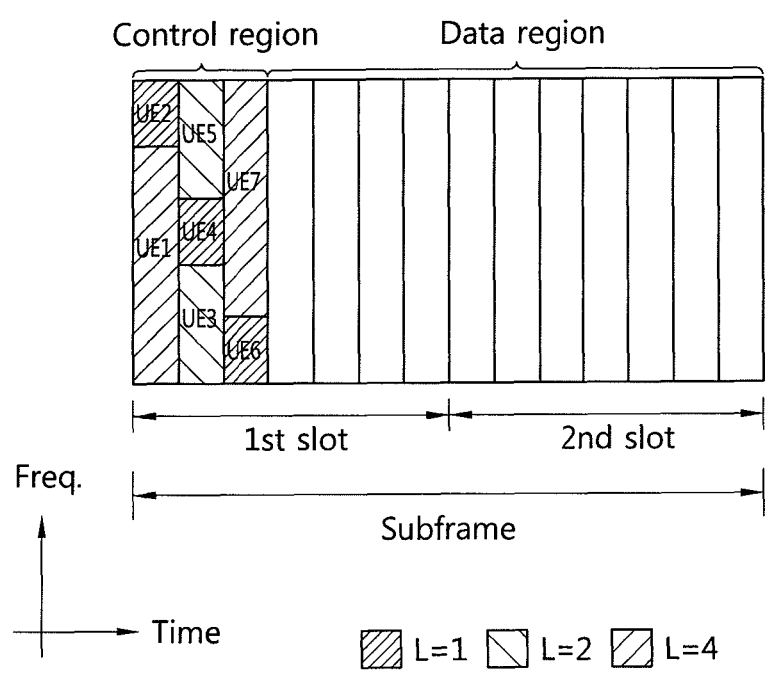
FIG. 5 illustrates the structure of the downlink subframe.

FIG. 5 illustrates the structure of the downlink subframe.

Referring to FIG. 5, 3 prior OFDM symbols of the first slot of the downlink subframe correspond to a control region to which a PDCCH is allocated and remaining OFDM symbols correspond to a data region to which a PDSCH is allocated. Control channels other than the PDCCH, such as PCFICH and PHICH, may be allocated to the control region. A UE may decode control information transmitted through the PDCCH to read data information transmitted through the PDSCH. Here, the number of OFDM symbols included in the control region in the subframe is not limited to 3 and can be known through PCFICH.

The control region is composed of a set of control channel elements (CCEs). This CCE set is a set of CCEs constructing the control region in the single subframe. The CCE corresponds to a plurality of resource element groups. For example, the CCE may correspond to 9 resource element groups. The resource element group is used to define mapping of control channels to resource elements. For instance, a single resource element group can be composed of 4 resource elements.

A plurality of multiplexed PDCCHs for a plurality of UEs may be transmitted within the control region. The PDCCH transfers control information such as scheduling allocation. The PDCCH is transmitted on aggregation of a single CCE or several contiguous CCEs. Hereinafter, the number of CCEs used for PDCCH transmission is referred to as a CCE aggregation level. For example, the CCE aggregation level may be elements of {1, 2, 4, 8}. The CCE aggregation level corresponds to the number of CCEs used for PDCCH transmission and is a CCE unit for searching PDCCH. The magnitude of the CCE aggregation level is defined by the number of contiguous CCEs. The CCE aggregation level may differ depending on UE. In FIG. 4, for instance, the CCE aggregation level of the 2nd, 4th and 6th UEs UE2, UE4 and UE6 is 1, the CCE aggregation level of the 3rd and 5th UEs UE3 and UE5 is 2, and the CCE aggregation level of the 1st and 7th UEs UE1 and UE7 is 4.

Figure 6:
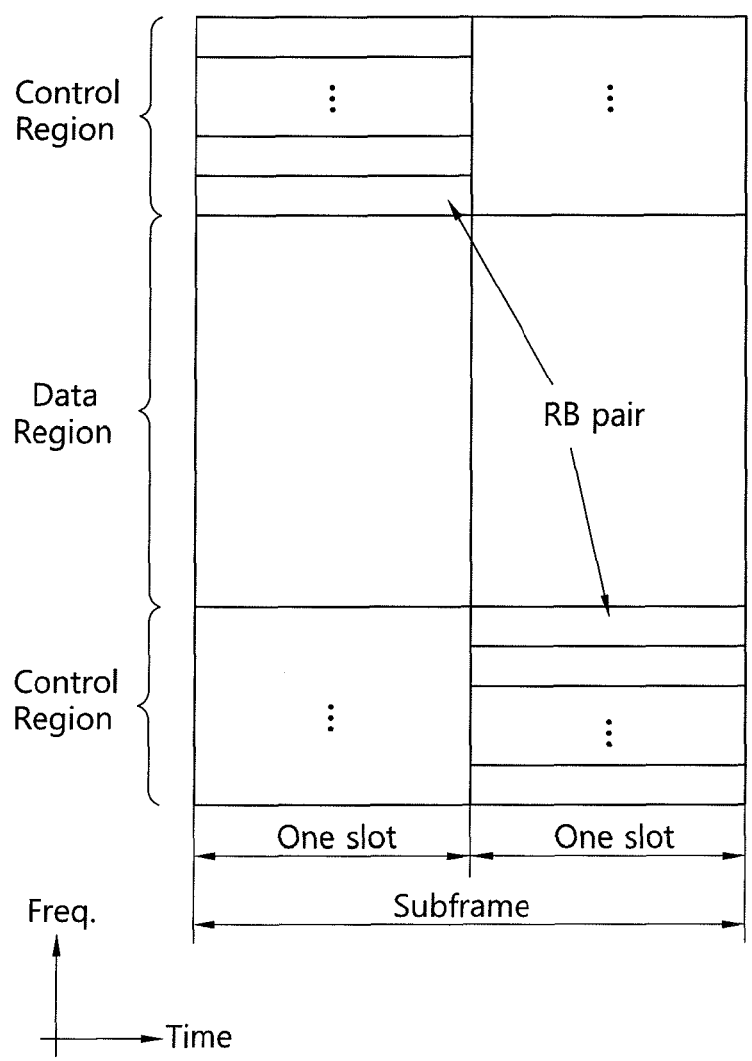
FIG. 6 illustrates the structure of the uplink subframe.

FIG. 6 illustrates the structure of the uplink subframe.

Referring to FIG. 6, the uplink subframe can be divided into a control region to which a PDCCH that transfers uplink control information in the frequency domain is allocated and a data region to which a PUSCH that transfers user data is allocated.

The PUCCH for the single UE is assigned to a resource block (RB) pair in the subframe and RBs belonging to the RB pair respectively have different subcarriers in two slots. That is, the RB pair allocated to the PUCCH frequency-hops at the slot boundary.

The PUCCH can support multiple formats. That is, the PUCCH can transmit uplink control information having different numbers of bits for subframes according to modulation scheme. The following table represents PUCCH format, modulation scheme and the number of bits, which are supported according to 3GPP TS 36.211 V8.2.0.

TABLE 2

| PUCCH format | Modulation scheme | Number of bits per subframe, M |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

PUCCH format 1 is used to transmit scheduling request SR, PUCCH format 1a/1b is used to transmit a representative ACK/NACK signal, PUCCH format 2 is used to transmit CQI, and PUCCH format 2a/2b is used to transmit CQI and the representative ACK/NACK signal.

The PUCCH format 1a/1b is used when a representative ACK/NACK signal is transmitted alone in an arbitrary subframe and the PUCCH format 1 is used when SR is transmitted alone. PUCCH formats for transmitting control information have been described above. An allocation scheme and allocation quantity of radio resources used to transmit the control information may differ depending on the PUCCH format.

Figure 7:
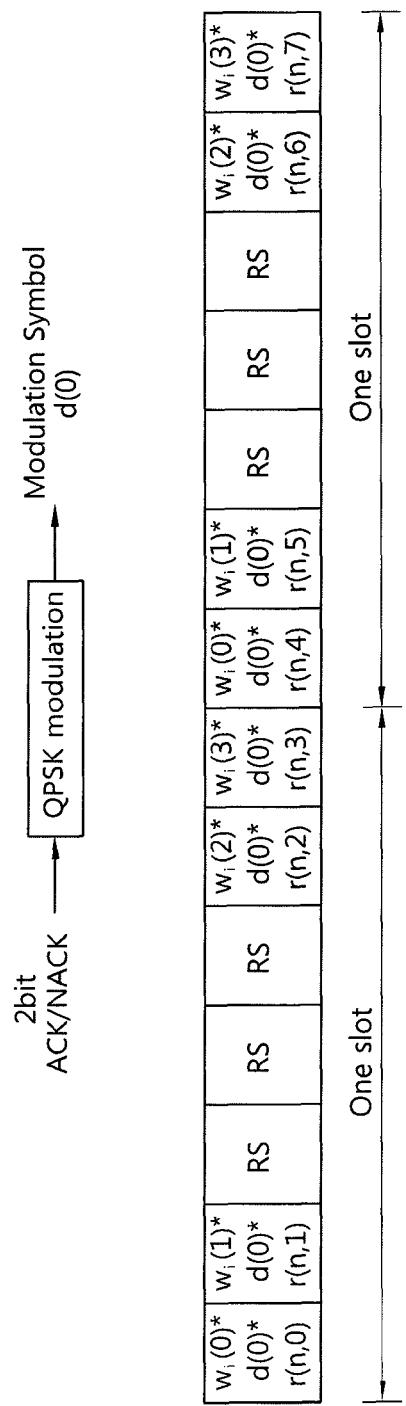
FIG. 7 illustrates transmission of an ACK/NACK signal in a PUCCH.

FIG. 7 illustrates transmission of an ACK/NACK signal in a PUCCH.

Referring to FIG. 7, a reference signal RS is loaded in 3 SC-FDMA symbols among 7 SC-FDMA symbols included in a single slot and a representative ACK/NACK signal is loaded in the remaining four SC-FDMA symbols. The reference signal SC is loaded in 3 contiguous SC-FDMA symbols in the middle of the slot.

To transmit the ACK/NACK signal, a 2-bit representative ACK/NACK signal is QPSK-modulated to generate a single modulation symbol d(0). A modulated sequence m(n) is generated based on the modulation symbol d(0) and the cyclically shifted sequence r(n,a). 'a' is an amount of cyclic shift (CS). It is possible to multiply the cyclically shifted sequence r(n,a) by the modulation symbol to generate a modulated sequence y(n) according to Equation 1.

$$y(n)=d(0)r(n,a)$$ [Equation 1]

The cyclically shifted sequence r(n,a) may have different CS amounts or the same CS amount for the respective SC-FDMA symbols. Although CS amounts 0, 1, 2 and 3 are sequentially set for 4 SC-FDMA symbols in a single slot in this case, this is exemplary.

Furthermore, although the single modulation symbol is generated by QPSK-modulating the 2-bit ACK/NACK signal in the current embodiment, it is also possible to BPSK-modulate a 1-bit ACK/NACK signal to generate a single modulation symbol. The number of bits of the ACK/NACK signal, modulation scheme and the number of modulation symbols are exemplary and do not limit the technical spirit of the present invention.

Furthermore, the modulated sequence can be spread using an orthogonal sequence in order to increase the capacity of a UE. Sequences represented in Table 3 can be used as orthogonal sequences $w_i(k)$ (i is a sequence index, $0 \leq k \leq K-1$) having a spreading factor of K=4.

TABLE 3

| Sequence index | [w(0), w(1), w(2), w(3)] |
| --- | --- |
| 0 | [+1 +1 +1 +1] |
| 1 | [+1 −1 +1 −1] |
| 2 | [+1 −1 −1 +1] |

Otherwise, sequences represented in Table 4 can be used as orthogonal sequences $w_i(k)$ (i is a sequence index, $0 \leq k \leq K-1$) having a spreading factor of K=3.

TABLE 4

| Sequence index | [w(0), w(1), w(2)] |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Here, an operation of spreading a sequence modulated through the orthogonal sequence $w_i(k)$ having a spreading factor of K=4 for 4 SC-FDMA symbols included in a single slot for a representative ACK/NACK signal is described.

Figure 8:
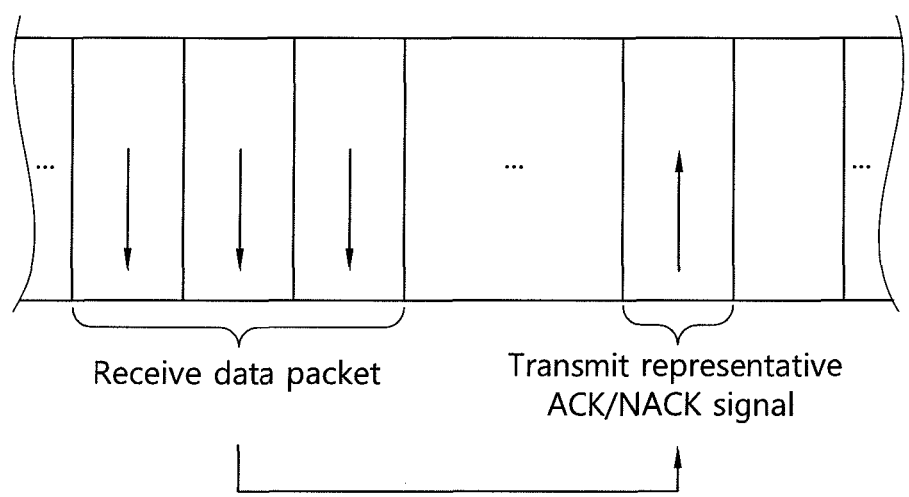
FIG. 8 illustrates a method of performing HARQ through ACK/NACK bundling according to an embodiment of the present invention.

FIG. 8 illustrates a method of performing HARQ through ACK/NACK bundling according to an embodiment of the present invention. FIG. 8 shows that a UE which has received downlink data transmits ACK/NACK signals to uplink in a TDD system in which the number of subframes used for downlink transmission is greater than the number of subframes used for uplink transmission. But the present invention is applied not only to a TDD system but also to a FDD system where ACK/NACK signals for plural downlink subframes are transmitted via a single uplink subframe Referring to FIG. 8, the UE transmits data corresponding to 3 contiguous downlink subframes or a single ACK/NACK signal corresponding to a PDSCH through a single uplink subframe. That is, the radio of the number of ACK/NACK signals to the data (or PDSCH) is 3:1. When a plurality of subframes are allocated to a specific UE for downlink transmission in the TDD system, ACK/NACK signals are transmitted in consideration of data transmitted to the downlink as a single HARQ packet.

Hereinafter, an ACK/NACK signal transmitted through a single uplink subframe according to ACK/NACK bundling is referred to as a representative ACK/NACK signal. And among a plurality of downlink subframes associated with the single uplink subframe, at least one downlink subframe by which data for a certain UE is transmitted is referred to as bundled downlink subframes. And each of the subframe included in the bundled downlink subframes is referred to as a bundled downlink subframe.

The UE determines the representative ACK/NACK signal as an ACK or NACK signal according to the following method. The UE performs decoding for a codeword that the US received in a bundled downlink subframe, and executes a logic AND operation on ACK signals or NACK signals for bundled downlink subframes to generate at least one representative ACK/NACK signal. That is, the UE transmits an ACK signal only when successively receiving all the codewords received on the bundled downlink subframes and transmits a NACK signal when failing in receiving any one of the codewords. Or, when a plurality of representative ACK/NACK signals is generated, the UE divides codewords, which is transmitted over bundled downlink subframes, into a plurality of codeword groups. So the UE can transmit ACK/NACK signal for each of the codeword group.

This is a principle of determining an ACK or NACK signal in consideration of downlink data composed of a plurality of codewords as single data. Here, a codeword is a unit of data transmitted for every bundled downlink subframe and may be referred to as a transport block.

Hereinafter, a set of codewords corresponding to the basis of decision in generating a representative ACK/NACK signal is referred to as a downlink data packet. Accordingly, it is considered that the UE successively receives the downlink data packet when the representative ACK/NACK signal is an ACK signal and it is considered that the UE fails in receiving the downlink data packet when the representative ACK/NACK signal is a NACK signal.

If a UE fails to decode downlink data packet, it is natural for the UE to transmit a NACK signal to a BS. And the BS retransmits the downlink data packet to the UE. But, if the UE misses scheduling information (or PDCCH) and cannot detect the existence of data of the missed bundled downlink subframe, the UE should perform HARQ only based on the rest of bundled downlink subframe(s) apart from the missed bundled downlink subframe. It doesn't matter when the UE is supposed to transmit a NACK signal, because the BS can retransmit downlink data. But when the UE is supposed to transmit an ACK signal, the data for the missed bundled downlink subframe is lost and cannot be recovered. Therefore, the BS or the UE need to know to which bundled downlink subframe the representative ACK/NACK signal is corresponds.

In FIG. 8, although it is assumed that the UE is the subject that transmits the ACK/NACK signal, the BS can also transmit the ACK/NACK signal in the same manner.

Figure 9:
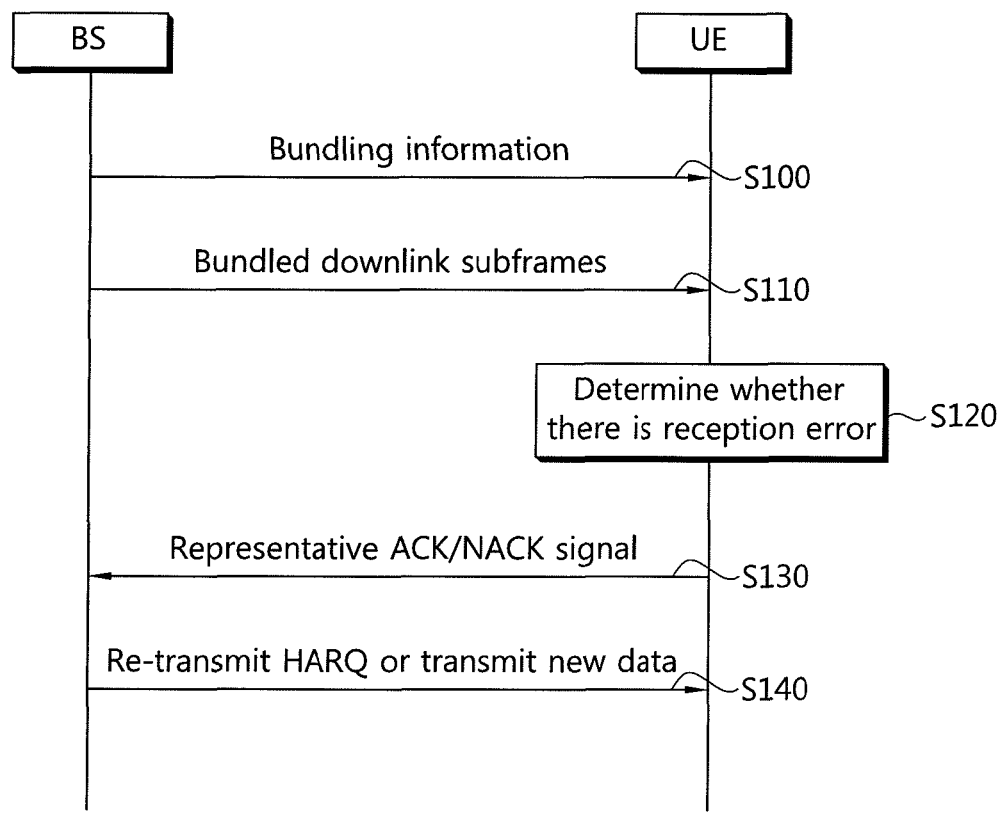
FIG. 9 is a flow diagram showing a method of performing HARQ in TDD system according to an embodiment of the present invention.

FIG. 9 is a flow diagram showing a method of performing HARQ in TDD system according to an embodiment of the present invention.

Referring to FIG. 9, a BS transmits a bundling indicator to a UE in step S100. The bundling indicator is control information which indicates bundled downlink subframes associated with a single uplink subframe for transmission of a representative ACK/NACK signal. The bundling indicator may be the number of bundled downlink subframe(s), or a transmission order of bundled downlink subframe(s). The bundling indicator is included in scheduling information and can be transmitted through a PDCCH. Otherwise, the bundling indicator can be included in bundled downlink data packets and transmitted. The bundling indicator will be described in more detail later.

The BS transmits to a specific UE a downlink data packet over bundled downlink subframes in step S110. The bundled downlink subframes may be contiguous subframes or discontinuous subframes. The downlink data packet is transmitted through a PDSCH that is a physical channel in every downlink subframe. When the bundling indicator is included in the bundled downlink data packet, the bundling indicator and the bundled downlink data packet can be simultaneously transmitted.

The UE detects the bundled downlink subframe(s) in step S120. The UE determines that there is no missing of bundled downlink subframe when all the bundled downlink subframes indicated by the bundling indicator are successfully received. And the UE determines that there is a missing bundled downlink subframe when failing in receiving any bundled downlink subframe. For instance, if the UE detects only two downlink subframes although the bundling indicator indicates that there are three bundled downlink subframes. The UE determines that a bundled downlink subframe is missed and generates a representative NACK signal to report that the UE failed in detecting one bundled downlink subframe. Of course, the UE determines that there is a reception error when it fails in receiving any one of the two downlink subframes.

The UE transmits the representative ACK/NACK signal to the BS in step S130. The UE transmits the representative ACK/NACK signal through a predetermined uplink subframe. The representative ACK/NACK signal may be transmitted through a PUCCH that is an uplink control channel or a PUSCH that is an uplink data channel. The uplink radio resources used to transmit the representative ACK/NACK signal will be described later in more detail.

The BS re-transmits HARQ when the representative ACK/NACK signal is a NACK signal and transmits new data when the representative ACK/NACK signal is an ACK signal in step S140.

The bundling indicator will now be explained in detail. In an embodiment, the bundling indicator may correspond to the number of bundled downlink subframes. The bundling indicator is 3 in FIG. 8, for example. The bundling indicator may be transmitted through all the bundled downlink subframes or some of the bundled downlink subframes. The UE counts the number of bundled downlink subframes that the UE detects. Then, the UE compares the bundling indicator with a counter. If the bundling indicator is different from the counter of the UE, the UE transmits a representative NACK signal to the BS or does not perform any operation and operates in a discontinuous transmission (DTX) mode. If the number of downlink subframes actually counted by the UE is 2 while a bundling indicator 3 is received, for instance, it means that UE fails in receiving a single downlink subframe, and thus the UE transmits the representative NACK signal to the BS or does not perform any operation.

In another embodiment, the bundling indicator can indicate a transmission order of bundled downlink subframes or a transmission order of PDSCH with respect to a specific UE. The UE counts the number of downlink subframes detected by itself. For instance, if 4 downlink subframes are associated with a single uplink subframe for a representative ACK/NACK signal, and 3 out of the 4 downlink subframes are bundled downlink subframes for a specific UE. Bundling indicators 1, 2 and 3 can be accumulatively assigned to the three bundled downlink subframes in sequence. The specific UE increases the counter whenever the UE detects a bundled downlink subframe. If the specific UE detects only bundled downlink subframes corresponding to the bundling indicators 1 and 3, for instance. The counter is 1 when the specific UE detects the 1st bundled downlink subframe. The specific UE fails in detecting the 2nd bundled downlink subframe, and thus the counter is still 1. When the specific UE detects the 3rd bundled downlink subframe, the counter is 2 although the bundling indicator is 3. The bundling indicator does not correspond to the counter, and thus it can be known that the specific UE fails in detecting PDCCH of the 2nd bundled downlink subframe corresponding to the bundling indicator 1. In this case, the specific UE may generate a representative NACK signal or do not perform any operation and operate in the DTX mode.

An example that the UE determines that there is a reception error is represented as follows.

$$\text{Bundling indicator} \neq (N_{DAI} - 1) \mod(a) + 1 \qquad \text{[Equation 2]}$$

Here, $N_{DAI}$ denotes the number of bundled downlink subframes successfully detected by the UE and mod(a) represents a modulo operation. When the bundling indicator is ceiling[$\log_2(a)$] bit information, the transmission order starts from 1 when the bundling indicator becomes greater than a maximum transmission order a, and thus the modulo operation is performed. In this manner, the UE can correctly transmit a representative ACK/NACK signal. Here, the bundling indicator can be also referred to as a downlink assignment index (DAI).

The information indicated by the bundling indicator may differ depending on DCI format. For example, when the DCI format is 0, the bundling indicator simply indicates the number of PDSCH transmissions associated with an uplink subframe which transmits a representative ACK/NACK signal for a specific UE. When the DCI format is 1/1A/1B/1D/2/2A, which is for downlink scheduling information, the bundling indicator indicates the accumulative number of PDSCH transmissions for the specific UE, and can be updated every subframe.

Radio resources used for a UE to transmit a representative ACK/NACK signal will now be explained. In ACK/NACK bundling, a single uplink subframe is used to transmit ACK/NACK signals for bundled downlink subframes. Accordingly, radio resources that will transmit the ACK/NACK signals with respect to the plurality of bundled downlink subframes must be allocated to the uplink subframe. If downlink data is transmitted to different UEs through 4 downlink subframes when the ratio of the number of downlink subframes to the number of uplink subframes is 4:1, for example, the UEs should be able to transmit the ACK/NACK signals through the same uplink subframe. Accordingly, a radio resource for ACK/NACK signals, which is four times the radio resource required when the ratio of the number of downlink subframes to the number of uplink subframes is 1:1, must be allocated to each uplink subframe.

On the contrary, when downlink data is transmitted to a single UE through bundled downlink subframes, a radio resource for a representative ACK/NACK signal corresponding to the bundled downlink subframes will not be used by other UEs. Accordingly, the single UE can transmit the representative ACK/NACK signal by using one of radio resources allocated for ACK/NACK signals.

According to the present invention, a UE transmits a representative ACK/NACK signal using a radio resource for ACK/NACK signals and the radio resource for the ACK/NACK signals are assigned for the last bundled downlink subframe in the bundled downlink subframes. This gives a criterion in which a BS determines whether PDSCH of the bundled downlink subframes is successfully transmitted or not. For example, if a UE misses the last bundled downlink subframe(s) in the bundled downlink subframes, the UE shall transmit a representative ACK/NACK signal using a radio resource assigned for the second last bundled downlink subframe. In this case, the BS can find out the last bundled downlink subframe(s) is missed, by the radio resource used to transmit the representative ACK/NACK signal.

Figure 10:
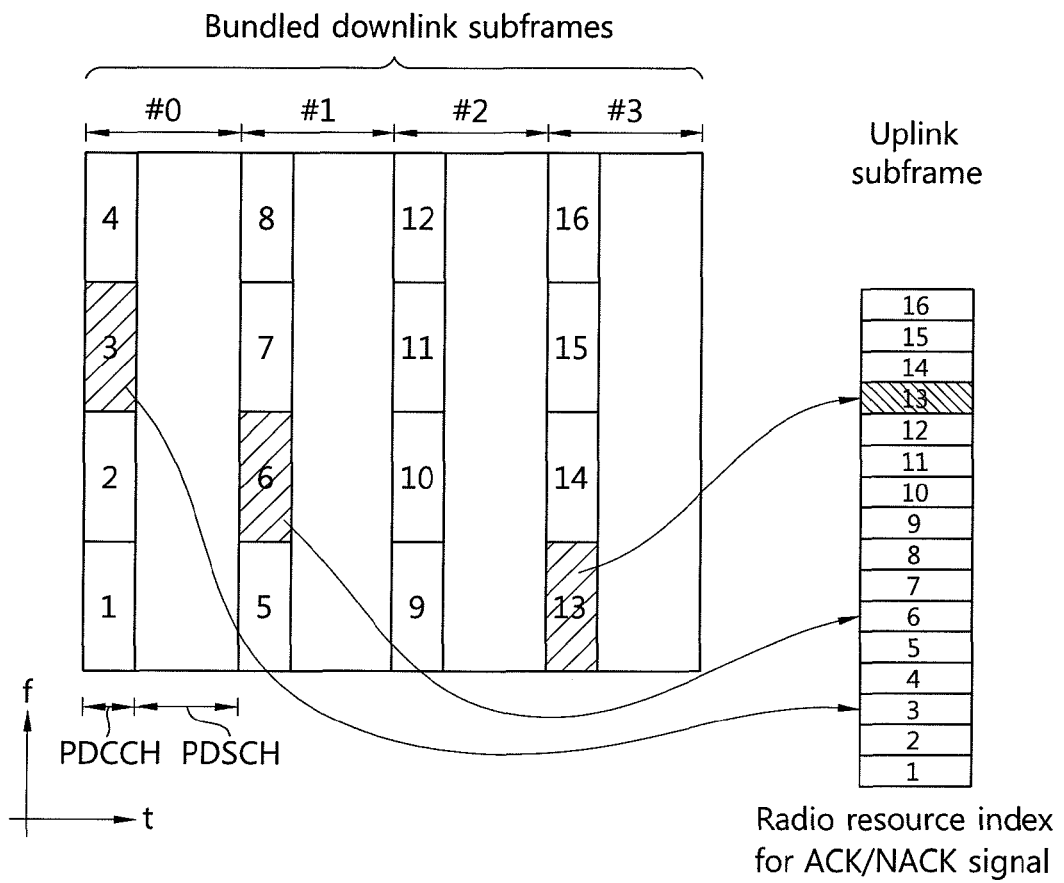
FIG. 10 illustrates a method of mapping a representative ACK/NACK signal to a radio resource according to an embodiment of the present invention.

FIG. 10 illustrates a method of mapping a representative ACK/NACK signal to a radio resource according to an embodiment of the present invention. Here, the representative ACK/NACK signal is transmitted through a PUCCH.

Referring to FIG. 10, a single uplink subframe is allocated to transmit an ACK/NACK signal for 4 downlink subframes. The specific position of the bundled downlink subframe(s) corresponding to an uplink subframe for the representative ACK/NACK signal, is defined a table below.

TABLE 5

| Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 5 | — | — | 6 | — | 4 |
| 1 | — | — | 7,6 | 4 | — | — | — | 7,6 | 4 | — |
| 2 | — | — | 8,7,6,4 | — | — | — | — | 8,7,6,4 | — | — |
| 3 | — | — | 11,7,6 | 6,5 | 5,4 | — | — | — | — | — |
| 4 | — | — | 12,11,8,7 | 7,6,5,4 | — | — | — | — | — | — |
| 5 | — | — | TBD | — | — | — | — | — | — | — |
| 6 | — | — | 7 | 7 | 5 | — | — | 7 | 7 | — |

In Table 5, the subframe n denotes an uplink subframe index. A bundled downlink subframe corresponding to an nth subframe (uplink subframe) is determined as n-k. That is, the bundled downlink subframe is indicated as a subframe prior to the nth subframe by k. Here, k denotes an indicator which determines the bundled downlink subframe and belongs to a set K including M elements $\{k_0, k_1, \ldots, k_{M-1}\}$. The position of the bundled downlink subframe is determined by the subframe n and configuration.

For example, if the representative ACK/NACK signal is transmitted through the 2nd subframe (n=2) when a radio frame is determined by configuration 2, the bundling indicator when n=2 corresponds to K={8,7,6,4}. Accordingly, bundled downlink subframes covered by the representative ACK/NACK signal correspond to 4th, 5th, 6th and 8th subframes prior to the 2nd subframe by 8, 7, 6 and 4. This is because the bundled downlink subframes are prior to the uplink subframe which transmits the representative ACK/NACK signal.

Each downlink subframe is composed of a PDCCH and a PDSCH and the PDCCH is segmented into 4 sections. The section can be referred to as a certain region of radio resources (i.e resource block (RB)). This segmentation is exemplary and the interval and number of segmented sections can be varied. A UE decodes the PDCCH through CCE, and then decodes the PDSCH according to downlink grant of the PDCCH. The UE receives data from the PDSCH and a region receiving the data may be composed of resource blocks which are radio resource units.

Radio resources for ACK/NACK signals for a specific PDCCH can be determined by a resource index. Here, the radio resources mean radio resources of the PUCCH. For example, the 0th downlink subframe uses radio resources corresponding to indexes 1, 2, 3 and 4 in the uplink subframe to transmit ACK/NACK signals and the 1st downlink subframe uses radio resources corresponding to indexes 5, 6, 7 and 8 in the uplink subframe to transmit the ACK/NACK signals. That is, radio resources used to transmit ACK/NACK signals through a single uplink subframe can be classified for the respective downlink subframes. Or to reduce the amount of radio resources for ACK/NACK signal transmission, it can be considered that the ACK/NACK signal resource for a certain downlink subframe can be duplicated with other downlink subframe.

If a specific UE receives a codeword through 0th, 1st and 3rd downlink subframes among the 4 bundled downlink subframes, the specific UE decodes section 3 of PDCCH of the 0th downlink subframe and reads PDSCH indicated by section 3. Further, the specific UE decodes section 6 of PDCCH of the 1st downlink subframe and reads PDSCH indicated by section 6. In addition, the specific UE decodes section 13 of PDCCH of the 3rd downlink subframe and reads PDSCH indicated by section 13.

The specific UE transmits a representative ACK/NACK signal according to whether the UE successfully receives the PDSCH or fails in receiving the PDSCH. Here, the specific UE does not use radio resource indexes 3 and 6 and transmits the representative ACK/NACK signal by using only radio resource index 13 corresponding to the last section 13 which has been received latest by the UE.

A radio resource of a bundled downlink subframe(s) that a UE detects the most recently (or nearest to the uplink subframe n), is used to transmit the representative ACK/NACK signal. The bundled downlink subframe(s) is included in downlink subframe associated with the uplink subframe n.

For example, it is assumed that the representative ACK/NACK signal is transmitted in uplink subframe 2 in configuration 2. Bundled downlink subframes are 4th, 5th, 6th and 8th subframes. If the UE detects the 4th, 5th and 8th subframes, the representative ACK/NACK signal is transmitted using the radio resource according to the last received 8th downlink subframe. This is performed when k=4. That is, when a downlink subframe according to the smallest number of elements which belong to the set K is determined, the radio resource used to transmit the representative ACK/NACK signal is determined according to the downlink sub frame.

This is a method of determining radio resources which transmit the representative ACK/NACK signal. A method of determining whether a representative ACK/NACK signal corresponds to an ACK signal or a NACK signal has been described above.

The specific UE cannot read the PDSCH indicated by section 13 if the UE does not detect section 13 of the PDCCH of the 3rd downlink subframe. Accordingly, the specific UE will transmit the representative ACK/NACK signal according to a radio resource index corresponding to the last received section 6. On the contrary, a BS expects to receive the representative ACK/NACK signal according to radio resource index 13 because the BS transmits downlink data according to section 13. However, the BS receives the representative ACK/NACK signal according to radio resource index 6, and thus the BS can recognize that transmission of downlink data last transmitted according to section 13 failed. Accordingly, the BS can perform HARQ re-transmission even if the representative ACK/NACK signal is an ACK signal.

If the method of selecting radio resource for ACK/NACK signal is combined with the method of detecting bundled downlink subframe with bundling indicator described above, it is possible to discover missed bundled downlink subframe(s) regardless of the position of the missed bundled downlink subframe(s) is in the middle or at the last. For example, it is assumed that the specific UE does not detect section 6 of the PDCCH of the 1st downlink subframe and detects section 13. The bundling indicator in the PDCCH of section 3 is 1, the bundling indicator in the PDCCH of section 6 is 2, and the bundling indicator in the PDCCH of section 13 is 3. The UE fails in detecting section 6, and thus the counter of the UE when the UE detects the PDCCH of section 13 still indicates 2. Here, the UE does not transmit the representative ACK/NACK signal according to the radio resource corresponding to section 13 and operates in the DTX mode. The BS expects to receive the representative ACK/NACK signal according to the radio resource index 13 because the BS has transmitted the downlink data according to section 13. However, the BS does not receive any representative ACK/NACK signal, and thus the BS can perform HARQ re-transmission.

The BS can discern the successful or unsuccessful transmission of bundled downlink subframes, with the radio resource for a representative ACK/NACK signal transmitted from the UE. And the UE can discern whether a bundled downlink subframe(s) is missed by comparing a bundling indicator with the number of detected bundled downlink subframes.

A method of transmitting an ACK/NACK signal by using radio resources used to transmit uplink data will now be explained. When a UE simultaneously transmits the uplink data when transmitting the ACK/NACK signal to an uplink subframe, a radio resource allocated to transmit the ACK/NACK signal may be not a radio resource for transmitting general control information. That is, the UE can transmit the ACK/NACK signal by using a radio resource in the PUSCH without using a radio resource in the PUCCH. Here, the ACK/NACK signal may be multiplexed with general uplink data.

The UE transmits a NACK signal with respect to downlink data that is not recognized or not for the UE as well as downlink data which is judged by the UE whether it is successfully received. A NACK signal formally transmitted for downlink data is referred to as a dummy NACK signal. When the dummy NACK signal is transmitted, a BS can be aware whether the UE properly receives the downlink data and whether the ACK/NACK signals transmitted from the UE are true.

Figure 11:
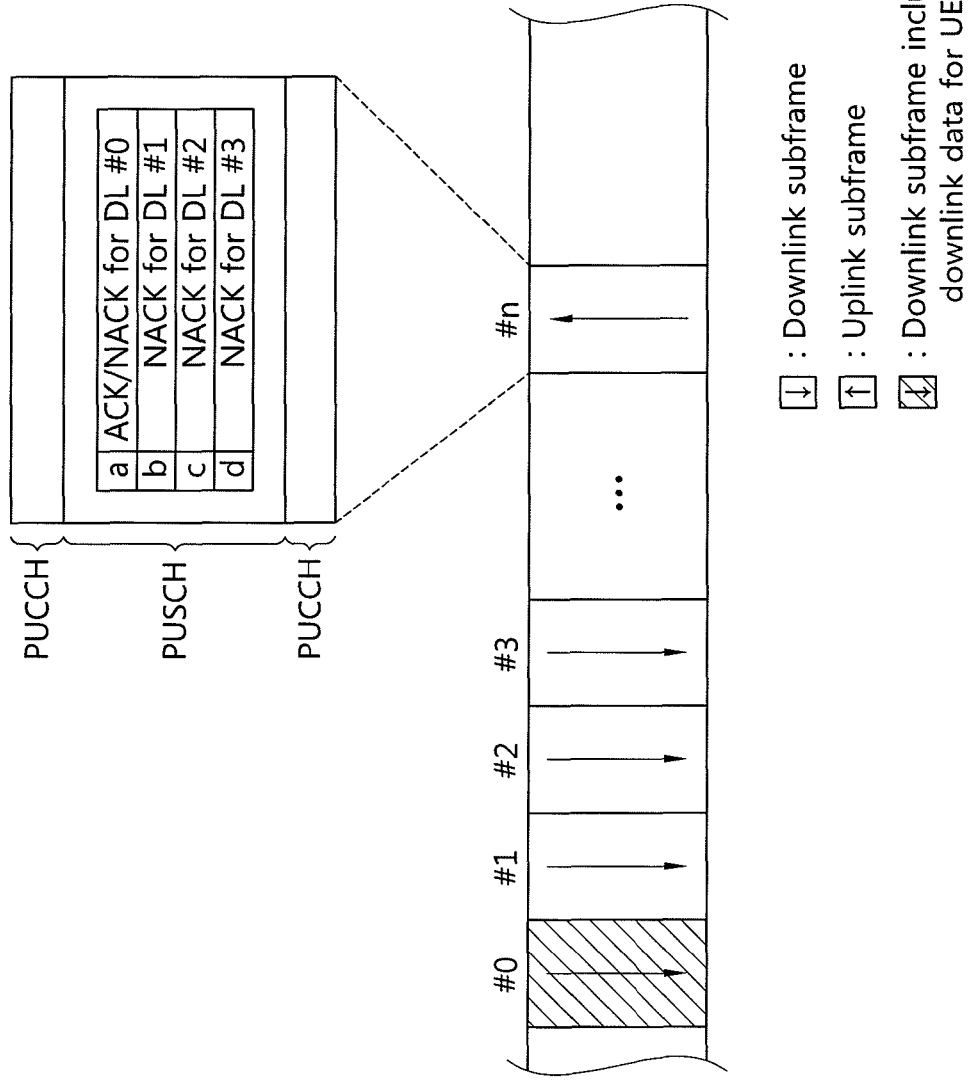
FIG. 11 illustrates a method of transmitting an ACK/NACK signal in a TDD system according to an embodiment of the present invention.

FIG. 11 illustrates a method of transmitting an ACK/NACK signal in a TDD system according to an embodiment of the present invention.

Referring to FIG. 11, there are 4 downlink subframes #0, #1, #2 and #3 and an plink subframe #n for transmitting ACK/NACK signals corresponding to the 4 downlink subframes #0, #1, #2 and #3. Only the downlink subframe #0 transmits downlink data for a UE A. Accordingly, the UE decodes the downlink subframe #0 and transmits an ACK/NACK signal with respect to the downlink subframe #0 by using a radio resource 'a' of the PUSCH of the uplink subframe #n. Further, the UE transmits 3 NACK signals as ACK/NACK signals with respect to the downlink subframes #1, #2 and #3 by using radio resources 'b', 'c' and 'd' of the PUSCH of the uplink subframe #n. The UE transmits all the ACK/NACK signals with respect to the downlink subframes #1, #2 and #3 even though downlink data for the UE A is not transmitted in the downlink subframes #1, #2 and #3. That is, the UE transmits 4 ACK/NACK signals.

Although the radio resources a, b, c and d are continuous in FIG. 11, radio resources for transmitting ACK/NACK signals can be scattered in the PUSCH. Furthermore, the method of mapping ACK/NACK signals to the radio resources a, b, c and d may be different from a radio resource mapping method for ACK/NACK signals in the PUCCH. Further, an ACK/NACK signal may be independently transmitted or multiplexed with uplink data and transmitted.

The ACK/NACK signal may be transmitted through the PUCCH if required. In this case, a representative ACK/NACK signal is transmitted as described above. The system can freely select whether the representative ACK/NACK signal is transmitted through the PUCCH or a dummy NACK signal is transmitted through the PDSCH. Further, an ACK/NACK signal may be dynamically transmitted while switching to the PUCCH and PUSCH.

To transmit the same amount of ACK/NACK signals with the number of maximum downlink subframes or data for a UE, causes an overhead problem because the amount of feedback increases. Hereinafter, a method for feedback reduction discloses.

Figure 12:
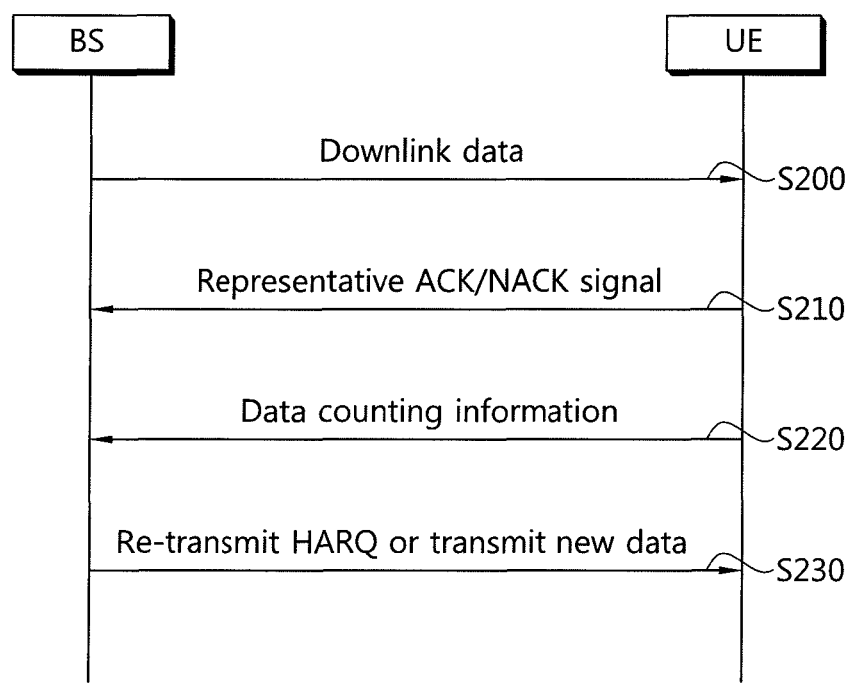
FIG. 12 is a flowchart illustrating a method of transmitting an ACK/NACK signal in a TDD system according to another embodiment of the present invention.

FIG. 12 is a flowchart illustrating a method of transmitting an ACK/NACK signal in a TDD system according to another embodiment of the present invention.

Referring to FIG. 12, a BS configures bundled downlink subframes with $N_D$ downlink subframes, and transmits data to a UE over the bundled downlink subframes in step S200. The downlink data is transmitted through PDSCH of the bundled downlink subframes. The UE transmits a representative ACK/NACK signal to the BS in step S210. The method of generating the representative ACK/NACK signal has been described with reference to FIG. 8. The UE transmits data counting information Nc to the BS in step S220. Nc Is the number of bundled downlink subframe(s) that the UE detects. So, $N_D=N_C+N_{missed}$. Here, $N_{missed}$ denotes the amount of bundled downlink subframes that is not detected (or recognized) by the UE.

The number of bits of the data counting information is ceiling[$\log_2(\max(N_D))$], if the data counting information is expressed in an independent information bit stream. The UE must transmit information of ceiling[$\log_2(\max(N_D))$]+2 bits through an uplink subframe, if the representative ACK/NACK signal is 2 bit. Therefore, it is more desirable in signaling overhead aspect to use both the representative ACK/NACK signal and the data counting information, than to transmit $2\times\max(N_D)$-bit ACK/NACK signals. The representative ACK/NACK signal and the data counting information are transmitted through a PUSCH.

The BS determines whether HARQ re-transmission is performed or new data is transmitted according to the representative ACK/NACK signal and the data counting information in step S230. This determination is performed by comparing $N_D$ and $N_C$ by the BS. In an embodiment, when the UE detects all the bundled downlink subframes, $N_{missed}=0$ and $N_C=N_D$. That is, the BS can be aware that no bundled downlink subframes are missed from the data counting information. Therefore, the BS performs HARQ retransmission or new data transmission according to the representative ACK/NACK signal.

In another embodiment, when the UE misses at least one of the bundled downlink subframes, $N_{missed}\neq 0$ and $N_C\neq N_D$. Therefore, the BS can be aware that the UE missed $N_{missed}$ bundled downlink subframe(s). Then, the BS can perform HARQ re-transmission even if the BS receives a representative ACK signal from the UE.

The aforementioned functions can be executed by processors such as microprocessors, controllers, microcontrollers, application specific integrated circuits (ASICs) and so on according to software or program codes coded to execute the functions. The design, development and implementation of the codes are obvious to those skilled in the art.

While the present invention has been particularly shown an described with reference to exemplary embodiments thereof, it will be understood by those of ordinary skill in the art that various changes in form and details may be made therein without departing from the spirit and scope of the present invention as defined by the following claims.

The invention claimed is:

1. A user equipment configured for transmitting a reception acknowledgement in a wireless communication system, the user equipment comprising:
    a transceiver configured to receive and transmit radio signals; and
    a processor operatively coupled with the transceiver and configured to:
        receive one or more downlink packets in a plurality of downlink subframes from a base station;
        determine an ACK/NACK condition for the plurality of downlink subframes as favorable or unfavorable; and
        instruct the transceiver to transmit an ACK/NACK signal on an uplink channel based on the determined ACK/NACK condition,
        wherein a resource used for transmission of the ACK/NACK signal is associated with a resource to receive a downlink packet in a prior downlink subframe of the plurality of downlink subframes.

2. The user equipment in claim 1, wherein the plurality of downlink subframes are Time Division Duplex (TDD) downlink subframes.

3. The user equipment in claim 1, wherein the plurality of downlink subframes are Frequency Division Duplex (FDD) downlink subframes.

4. The user equipment in claim 1, wherein each of the plurality of downlink subframes includes the same packet or substantially the same packet.

5. The user equipment in claim 1, wherein the processor is configured to:
    receive a bundling indicator which indicates a number of bundled downlink subframes in the plurality of downlink subframes, and
    determine whether at least one bundled downlink subframe is missed by comparing the bundling indicator with the number of detected bundled downlink subframes.

6. The user equipment in claim 5, wherein the processor is configured to generate the ACK/NACK signal when no bundled downlink subframe is missed.

7. The user equipment in claim 6, wherein each subframe of the bundled downlink subframes is used to transmit one or plural codewords, and
    wherein the representative ACK/NACK signal is an ACK signal if all codewords in the bundled downlink subframes are successfully received.

8. A method implemented in a user equipment for transmitting a reception acknowledgement in a wireless communication system, the method comprising:
    receiving one or more downlink packets in a plurality of downlink subframes from a base station;
    determining an ACK/NACK condition for the plurality of downlink subframes as favorable or unfavorable; and
    transmitting an ACK/NACK signal on an uplink channel based on the determined ACK/NACK condition,
    wherein a resource used for transmission of the ACK/NACK signal is associated with a resource to receive a downlink packet in a prior downlink subframe of the plurality of downlink subframes.

9. The method in claim 8, wherein the plurality of downlink subframes are Time Division Duplex (TDD) downlink subframes.

10. The method in claim 8, wherein the plurality of downlink subframes are Frequency Division Duplex (FDD) downlink subframes.

11. The method in claim 8, wherein each of the plurality of downlink subframes includes the same packet or substantially the same packet.

12. The method in claim 8, further comprising:
    receiving a bundling indicator which indicates a number of bundled downlink subframes in the plurality of downlink subframes, and
    determining whether at least one bundled downlink subframe is missed by comparing the bundling indicator with the number of detected bundled downlink subframes.

13. The method in claim 12, further comprising generating the ACK/NACK signal when no bundled downlink subframe is missed.

14. The method in claim 13, wherein each subframe of the bundled downlink subframes is used to transmit one or plural codewords, and
wherein the representative ACK/NACK signal is an ACK signal if all codewords in the bundled downlink subframes are successfully received.

\* \* \* \* \*